United States Patent [19]
Lee et al.

[11] Patent Number: 5,170,370
[45] Date of Patent: Dec. 8, 1992

[54] VECTOR BIT-MATRIX MULTIPLY FUNCTIONAL UNIT

[75] Inventors: William Lee; Gary J. Geissler; Steven J. Johnson; Alan J. Schiffleger, all of Chippewa Falls, Wis.

[73] Assignee: Cray Research, Inc., Eagan, Minn.

[21] Appl. No.: 616,736

[22] Filed: Nov. 21, 1990

Related U.S. Application Data

[63] Continuation of Ser. No. 438,679, Nov. 17, 1989, abandoned.

[51] Int. Cl.⁵ ............................................. G06F 7/52
[52] U.S. Cl. ..................................... 364/736; 364/754
[58] Field of Search .................... 364/750.5, 736, 754, 364/757

[56] References Cited

U.S. PATENT DOCUMENTS

| | | | |
|---|---|---|---|
| 4,128,880 | 12/1978 | Cray, Jr. | 364/200 |
| 4,574,311 | 3/1986 | Resnikoff et al. | 358/213 |
| 4,598,400 | 7/1986 | Hillis | 370/60 |
| 4,636,942 | 1/1987 | Chen et al. | 364/200 |
| 4,691,291 | 9/1987 | Wolfram | 364/578 |
| 4,754,398 | 6/1988 | Pribnow | 364/200 |
| 4,757,444 | 7/1988 | Aoyama et al. | 364/736 |
| 4,773,038 | 9/1988 | Hillis et al. | 364/900 |
| 4,791,641 | 12/1988 | Hillis | 371/38 |
| 4,805,091 | 2/1989 | Thiel et al. | 364/200 |
| 4,805,173 | 2/1989 | Hillis | 371/38 |
| 4,809,202 | 2/1989 | Wolfram | 364/717 |
| 4,814,980 | 8/1989 | Peterson et al. | 364/200 |
| 4,825,361 | 4/1989 | Omoda et al. | 364/736 |
| 4,827,403 | 5/1989 | Steele, Jr. et al. | 364/200 |
| 4,841,469 | 6/1989 | Kuenemund et al. | 364/754 |
| 4,849,882 | 7/1989 | Aoyama et al. | 364/736 |

FOREIGN PATENT DOCUMENTS

| | | |
|---|---|---|
| 0251594 | 1/1988 | European Pat. Off. |
| 0270198 | 6/1988 | European Pat. Off. |
| 88/01366 | 11/1988 | European Pat. Off. |
| 87/03072 | 11/1987 | PCT Int'l Appl. |
| 87/02181 | 3/1988 | PCT Int'l Appl. |
| 88/01341 | 11/1988 | PCT Int'l Appl. |

OTHER PUBLICATIONS

Passwork User's Guide, by Iobst & Turnbull, Supercomputing Research Center, Jun. 1989.

*Primary Examiner*—Long T. Nguyen
*Attorney, Agent, or Firm*—Merchant, Gould, Smith, Edell, Welter and Schmidt

[57] ABSTRACT

A method and apparatus provides bit manipulation of data in vector registers of a vector register computer system. Matrix multiplication is accomplished at a bit level of data stored as two matrices in a vector computer system to produce a matrix result. The matrices may be at least as large as 64 bits by 64 bits and multiplied by another 64 by 64 matrix by means of a vector matrix multiplication functional unit operating on the matrices within a vector processor. The resulting data is also stored at a 64 bit by 64 bit matrix residing in a resultant vector register.

4 Claims, 12 Drawing Sheets

FIG. 5A

VL=32 FOR THE FIRST INSTRUCTION, AND
VL=50 FOR THE REMAINING INSTRUCTIONS

B

| BITS 63 → 14 → 0 | ELEMENTS |
|---|---|
| $b_{11}$ $b_{12}$ ... $b_{1,50}$ | 0 |
| $b_{21}$ $b_{22}$ ... $b_{2,50}$ | 32 |
| .... | |
| $b_{50,1}$ ... $b_{50,50}$ | 49 |
| UNUSED DATA | 63 |

V0

STEP ①  174 × 04

$B^t$

| BITS 63 → 14 → 0 | ELEMENTS 0 |
|---|---|
| $b_{11}$ $b_{21}$ ... $b_{32,1}$ | |
| $b_{12}$ $b_{22}$ ... $b_{32,2}$ | 31 |
| .... | |
| $b_{1,50}$ ... $b_{32,50}$ | |
| 0's | |

FUNCTIONAL UNIT

A

| BITS 63 → 14 → 0 | ELEMENTS |
|---|---|
| $a_{11}$ $a_{12}$ ... $a_{1,50}$ | 0 |
| $a_{21}$ $a_{22}$ ... $a_{2,50}$ | |
| .... | |
| $a_{50,1}$ ... $a_{50,50}$ | 49 |
| UNUSED DATA | 63 |

V1

STEP ②  174216 ↑

C

| BITS 63 → 32 31 → 0 | ELEMENTS |
|---|---|
| $c_{11}$ ... $c_{1,32}$ | 0 |
| $c_{21}$ ... $c_{2,32}$ | |
| .... | 0's |
| $c_{50,1}$ ... $c_{50,32}$ | 49 |
| UNUSED DATA | 63 |

V2

STEP ②  174216 ↑

VECTOR BIT-MATRIX MULTIPLY FUNCTIONAL UNIT

This is a continuation of application Ser. No. 07/438,679, filed Nov. 17, 1989, now abandoned.

FIELD OF THE INVENTION

The present invention relates to vector register supercomputers and in particular the present invention describes the implementation of bit-oriented vector instruction opcodes for fine grain data manipulation within a large grain vector register parallel processor supercomputer.

BACKGROUND OF THE INVENTION

Large grain vector processing computers are well known in the art. The term "large grain" used in the art refers to a parallel processing machine having a small number of fast processors. The term "fine grain", also called massively parallel, refers to a parallel processor computer using a very large number of relatively slow processors. The single processor of the Cray-1 supercomputer produced by Cray Research, Inc., the assignee of the present invention, contains a plurality of vector registers each of which is adapted for holding a plurality of elements in an ordered set of data. These vector registers are typically one word wide by n words deep, where the word length is 64 bits. The vector registers are connected to a plurality of functional units which receive the vector operands for executing instructions in response to opcodes and which have outputs for delivering the results computed or processed by the functional units. The operands presented from the vector registers to the functional units and received as output from the functional units may be queued up in a mode of operation known as vector chaining to increase throughput of the functional units. By using chaining, more than one result can be obtained per clock period. A detailed description of the Cray-1 supercomputer architecture is contained in U.S. Pat. No. 4,128,880 which is assigned to the assignee of the present invention and which is hereby incorporated by reference.

Multiprocessing vector register supercomputers are known in the prior art which combine a plurality of vector register processors to operate in parallel and to share a common local memory. Interaction between the vector register processors is accomplished by common semaphore and information registers. To provide interprocessor communication between the multiple vector register processors, a plurality of semaphore registers and a plurality of information registers are accessed by any one of the processors to facilitate interprocessor communication. Each processor then uses a local control circuit to accomplish, among other things, coordination of processors whereby delays associated with communicating between processors are avoided. A system for multiprocessor communication between register processors is described in U.S. Pat. No. 4,754,398 assigned to the assignee of the present invention, and which is hereby incorporated by reference.

In multiprocessor vector register supercomputers, each processor accesses a central common memory through a plurality of memory reference ports. These ports are connected to a plurality of registers which are directly addressed by the processor. The registers are used for holding information which can be used by the processor as operands. The shared memory includes a memory access conflict resolution circuit which senses and prioritizes conflicting references to the central memory from the processors thereby eliminating memory access collisions by the processors. A detailed description of vector register multiprocessing control and memory access is described in U.S. Pat. No. 4,636,942 assigned to the assignee of the present invention, and which is hereby incorporated by reference. Vector register supercomputers of the prior art are designed to operate on large grain data which is arranged as vectors. The vectors are typically 64 bits wide and n words deep where n depends upon the machine vector length capabilities. In the prior art, the Y-MP supercomputer produced by Cray Research, Inc., the assignee of the present invention, allows a vector register length of 64 words thereby allowing a vector of 1 word by 64 words. The functional units of a single processor of the Y-MP supercomputer operate on large grain operands contained in the vector registers which may be at the most 1 word by 64 words. The functional units operate on the vector operands to perform such operations as floating point multiply, floating point add, vector add, logical operations and other operations.

The Cray multiprocessing supercomputers accomplish parallel processing of data in a form commonly termed MIMD (Multiple Instruction stream/Multiple Data stream). The MIMD process is the ability of a multiprocessor computer to simultaneously process different instructions operating on different data streams. The granularity of parallelism in the Cray vector processor machines is a word-wide minimum granule of data. Matrix mathematics performed on the Cray MIMD machines uses 1-word width elements as the matrix elements. Matrix multiplication, therefore, is a serial process of operating on the 1-word wide elements of the matrix until all elements of the matrix have been processed to create a resultant matrix. Depending on the matrix operation, the MIMD architecture will allow plural processors to operate on portions of the matrix at any given time.

In contrast to this architecture, a SIMD (Single Instruction stream/Multiple Data stream)machine can process multiple data streams using the same set of instructions simultaneously. In a fine grain SIMD parallel architecture, each element of a matrix is processed by a single processor. The plurality of processors operating in parallel all execute the same instructions on the data at the same time to produce parallel results. If the number of processors equals the number of elements in a matrix, the entire matrix can be processed in parallel simultaneously.

The data granularity of parallelism and the number of processors in SIMD and MIMD architectures determine the speed at which the architecture can process a matrix problem. In the prior art, the Connection Machine CM-2 produced by Thinking Machines Corporation of Cambridge, Mass. is a fine grain SIMD architecture with 64K (65,536) processors that execute data in parallel operations. Each processor operates on a single bit of data and all processors execute the same instruction in parallel. This type of parallel operation is fast; however, the amount of external communications between executions is enormous and at least partially offsets the advantage of the massively parallel execution.

The CM-2 machine is a special purpose processor which requires a front-end or support processor to download the data for specialized execution. The support processor handles the user interface, executes the user,s programs, handles the I/O with the CM-2 and performs the scalar operations. Additional communication time is required, therefore, to download the operation to the specialized processor to take advantage of the massively parallel operation of the single bit processors. One of the contrasts between the Y-MP MIMD and CM-2 SIMD architectures is the granularity of parallelism. The Y-MP computer has 8 parallel processors operating on 64-bit words arranged as 64 word vectors. All 8 processors can simultaneously operate on different vector data streams. The CM-2 machine can operate on 64K (65,536) separate single-bit data streams; however, all processors execute the same instruction in parallel.

There is a need in the prior art, therefore, to implement SIMD-style bit manipulation instruction sets in large grain MIMD type computers to allow large grain MIMD-type computers to emulate fine grain SIMD operation. In this fashion, there is a need in the prior art for instructions which will treat vectors as a plurality of independent multiple data streams and operate on the data in those vectors in parallel. In particular, there is a need in the prior art for bit manipulation instructions in a MIMD-type machine. These can be used to accomplish SIMD-style operation on the data, among other things. For example, there is a need in the prior art for array operations which treat each element of the array as a single bit and operate on the entire array in parallel using MIMD architectures.

SUMMARY OF THE INVENTION

The present invention solves these and other shortcomings of the prior art described above. The present invention also solves other shortcomings of the prior art which will become apparent to those skilled in the art upon reading and understanding the present specification.

The present invention is a method and apparatus of providing bit manipulation of data in vector registers of a vector register machine. This capability will allow emulation of some portions of a SIMD architecture in a MIMD architecture style machine, among other things. The present invention accomplishes matrix multiplication at a bit level for an $N \times M^t$ ($N \times M$ transposed) operation in a vector register machine producing a bit-matrix result. The matrix may be at least as large as 64 bits by 64 bits held in a vector register of a MIMD machine and multiplied by another 64 by 64 bit matrix transposed by means of a matrix multiplication functional unit operating on the vector registers within a processor. The matrix result is a 64 bit by 64 bit matrix residing in a resultant register. The preferred embodiment of the present invention is a specialized Y-MP processor having a modified instruction set.

BRIEF DESCRIPTION OF THE DRAWINGS

In the drawings where like numerals refer to like components throughout several views.

FIGS. 5A and 5B are detailed example of the instruction sequences used to multiply bit-matrices larger than $32 \times 32$.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Figure 1A:
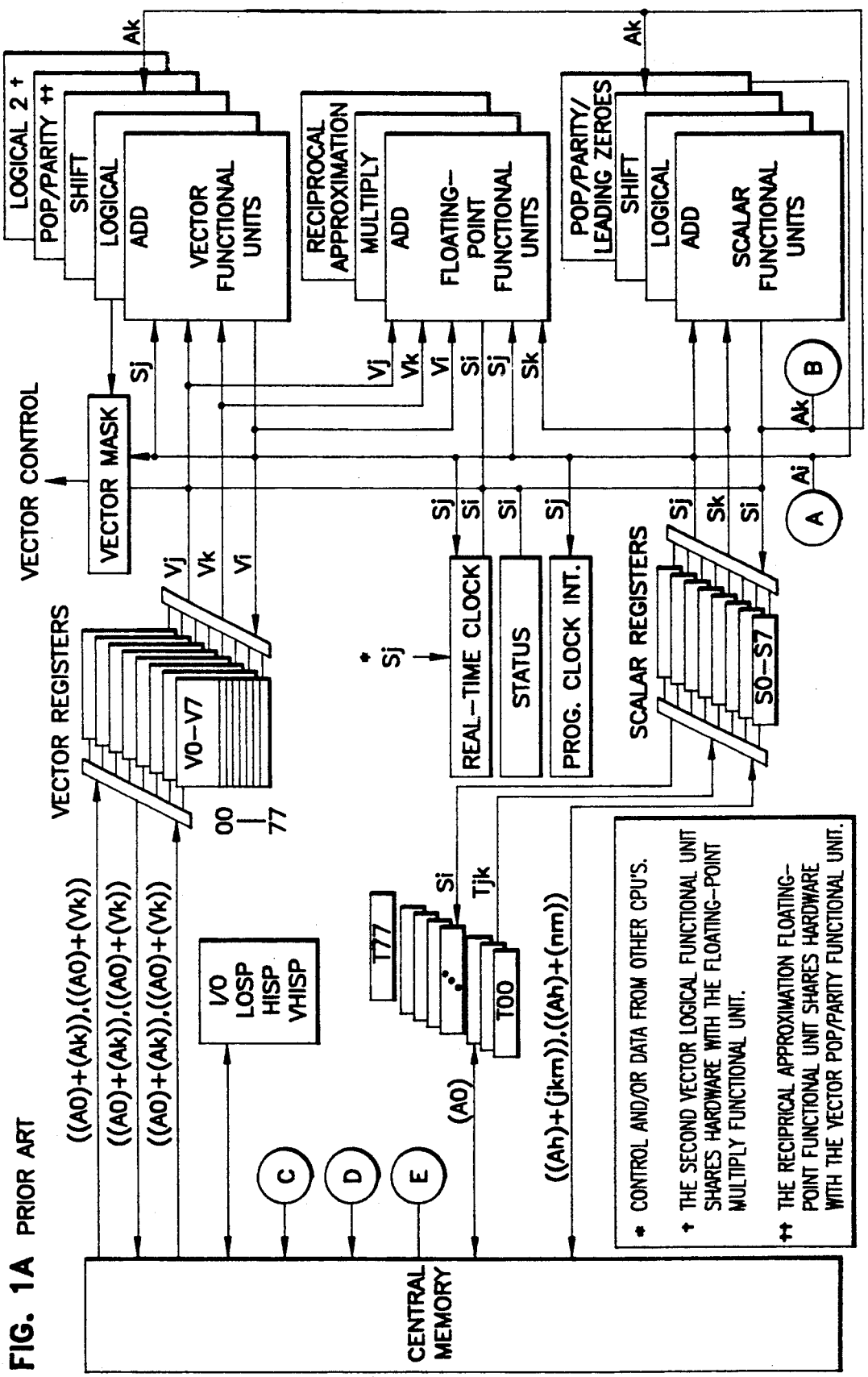
FIGS. 1A and 1B are detailed block diagram of a single processor in the Cray Research Y-MP vector register supercomputer.
Figure 1B:
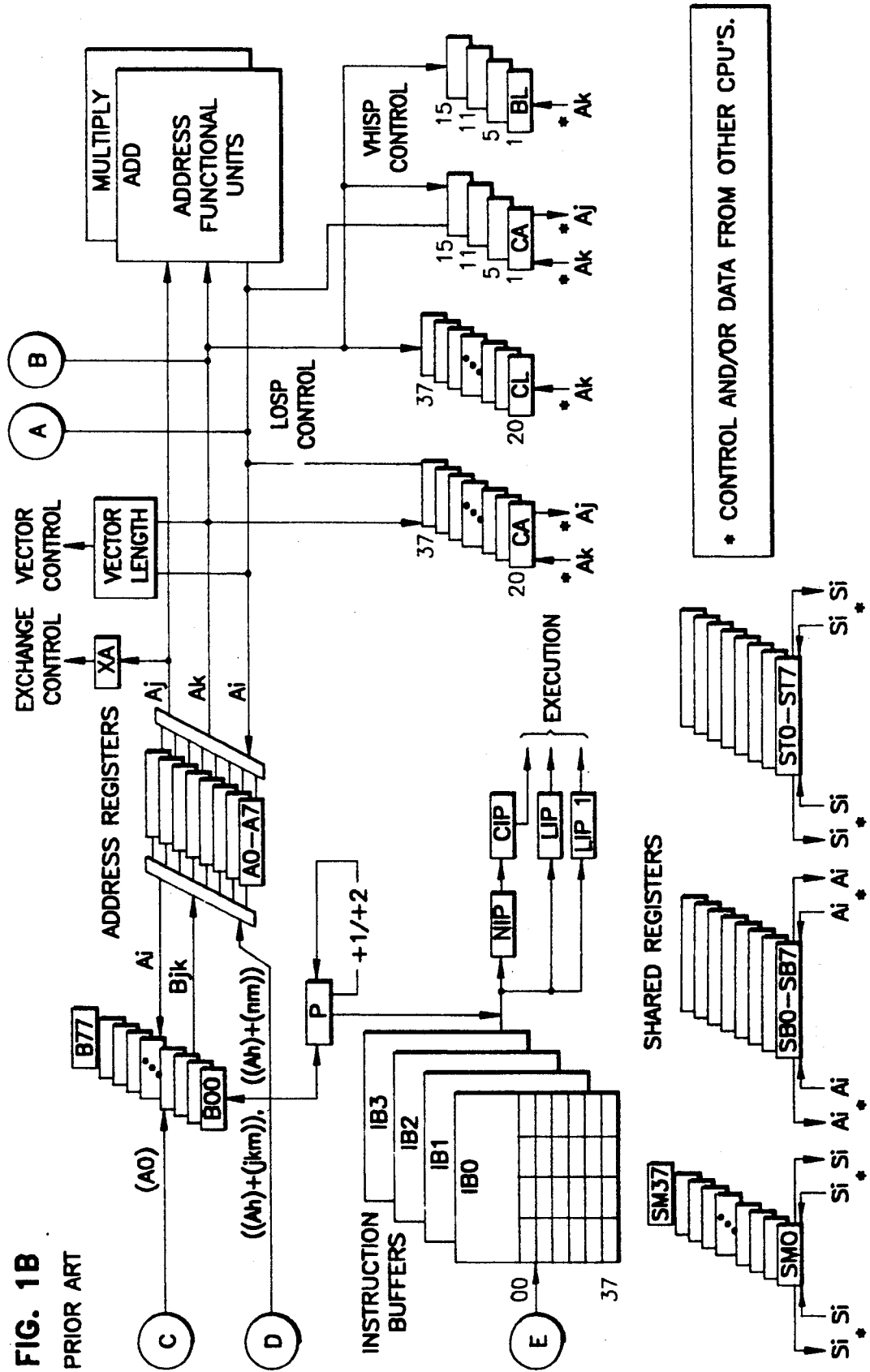

FIGS. 1A and 1B show a single processor of a Cray Research Y-MP multiprocessor vector register supercomputer. Vector registers V0–V7 shown at the center top of FIG. 1A are 64-bits wide with 64 word deep (labeled $00_8$–$77_8$). The vector registers receive their data from a central memory and feed the functional units. As shown, there are 5 vector functional units and 3 floating point functional units. The preferred embodiment of the present invention replaces the vector reciprocal functional unit with hardware to execute vector bit-matrix instructions. This new hardware includes the vector pop/parity functional unit. The instruction set of a Y-MP computer is modified to execute the new bit-matrix manipulation instructions to provide the functionality of the present invention. Those skilled in the art will readily recognize that additional functional units could be added to implement the bit matrix manipulation functions.

Figure 2:
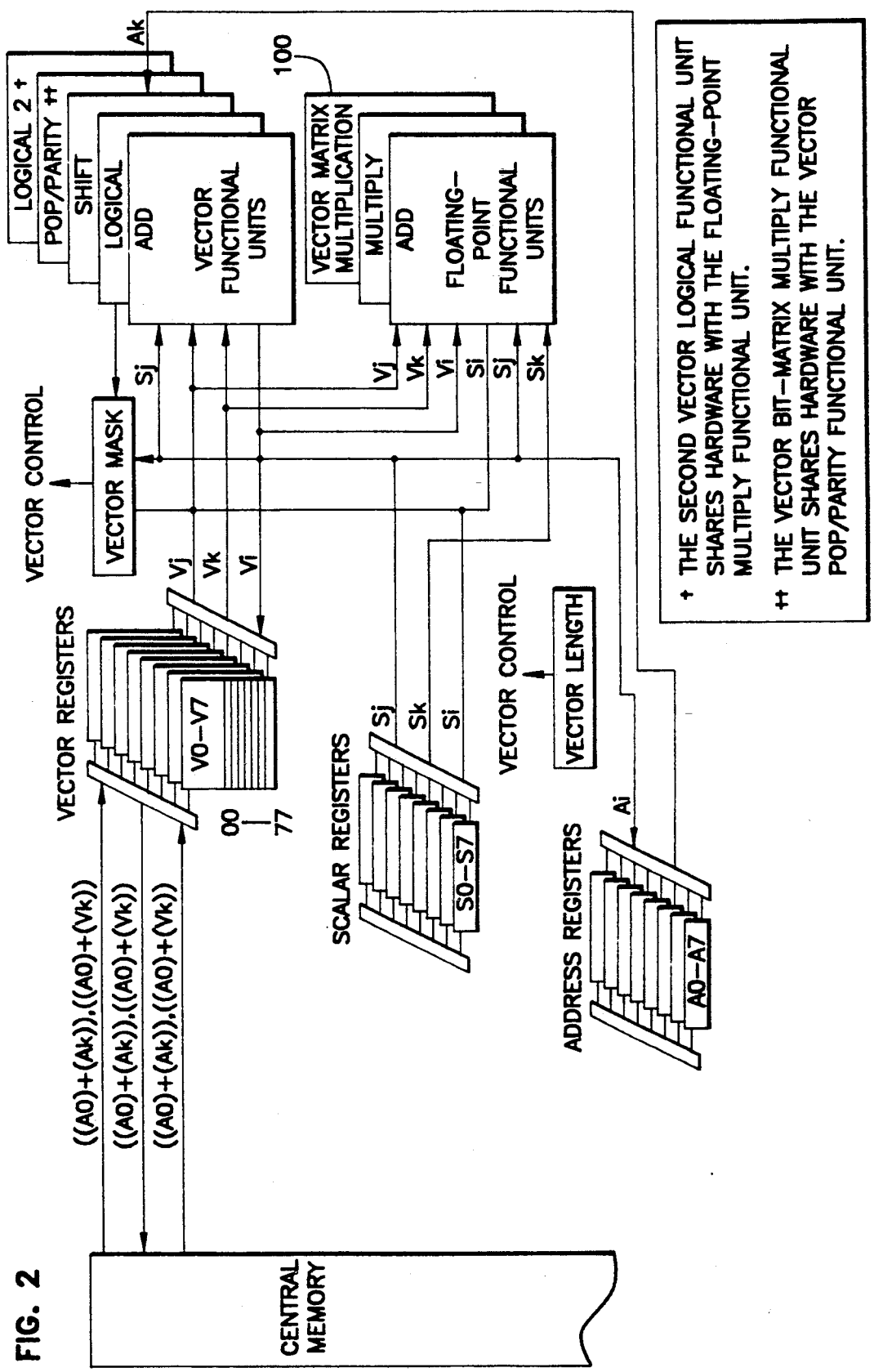
FIG. 2 is a detailed view of FIGS. 1A and 1B isolated to the vector registers and the functional units of a modified Cray Research Y-MP supercomputer.

FIG. 2 shows a detailed view of FIGS. 1A and 1B isolated to the vector registers and the functional units of a modified Cray Research Y-MP supercomputer. The vector reciprocal functional unit has been eliminated and a vector matrix multiply functional unit 100 substituted. This new functional unit also performs Pop/Parity. The vector matrix multiply functional unit 100 performs a logical multiplication of two square bit matrices of equal size held in vector registers of a single vector register processor. The size of the matrices may vary from $1 \times 1$ to $64 \times 64$. Since the matrices must be square, a vector length of 20 (VL=20) indicates a $20 \times 20$ bit matrix in which the contents of elements 0–19 must be left justified and zero-filled in bit positions 0–43; elements 20–63 are not used and the data stored in them is irrelevant. If A and B are the two matrices sent to the vector bit-matrix functional unit, the result matrix C generated will be the product of A and B transpose, that is, $C = AB^t$. All matrices are stored in vector registers, with the vector elements (words) representing rows of the matrix, and the bits of each element representing column entries. Throughout this specification, the terms row and column are used when referring to matrices, and the terms element and bit are used when referring to vector registers.

The bit-matrix multiply operation is defined in the following specification, in which A and B are two $n \times n$ bit square matrices (where $1 \leq n \leq 64$). The entries in each matrix are represented by lowercase letters with two subscripts. The first subscript denotes the row and the second subscript denotes the column in which the entry is located. Thus, $a_{23}$ represents the entry in row 2, column 3 of the A matrix. Matrices A and B are represented as shown below.

$$A = \begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \cdot & \cdot & \cdot & & \cdot \\ \cdot & \cdot & \cdot & & \cdot \\ \cdot & \cdot & \cdot & & \cdot \\ a_{n1} & a_{n2} & a_{n3} & \cdots & a_{nn} \end{bmatrix}$$

$$B = \begin{bmatrix} b_{11} & b_{12} & b_{13} & \cdots & b_{1n} \\ b_{21} & b_{22} & b_{23} & \cdots & b_{2n} \\ b_{31} & b_{32} & b_{33} & \cdots & b_{3n} \\ \cdot & \cdot & \cdot & & \cdot \\ \cdot & \cdot & \cdot & & \cdot \\ \cdot & \cdot & \cdot & & \cdot \\ b_{n1} & b_{n2} & b_{n3} & \cdots & b_{nn} \end{bmatrix}$$

The matrix $B^t$ is formed from B by interchanging its rows and columns:

$$B^t = \begin{bmatrix} b_{11} & b_{21} & b_{31} & \cdots & b_{n1} \\ b_{12} & b_{22} & b_{32} & \cdots & b_{n2} \\ b_{13} & b_{23} & b_{33} & \cdots & b_{n3} \\ \cdot & \cdot & \cdot & & \cdot \\ \cdot & \cdot & \cdot & & \cdot \\ \cdot & \cdot & \cdot & & \cdot \\ b_{1n} & b_{2n} & b_{3n} & \cdots & b_{nn} \end{bmatrix}$$

The product $AB^t$ is defined as follows:

$$AB^t = \begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \cdot & \cdot & \cdot & & \cdot \\ \cdot & \cdot & \cdot & & \cdot \\ \cdot & \cdot & \cdot & & \cdot \\ a_{n1} & a_{n2} & a_{n3} & \cdots & a_{nn} \end{bmatrix} \begin{bmatrix} b_{11} & b_{21} & b_{31} & \cdots & b_{n1} \\ b_{12} & b_{22} & b_{32} & \cdots & b_{n2} \\ b_{13} & b_{23} & b_{33} & \cdots & b_{n3} \\ \cdot & \cdot & \cdot & & \cdot \\ \cdot & \cdot & \cdot & & \cdot \\ \cdot & \cdot & \cdot & & \cdot \\ b_{1n} & b_{2n} & b_{3n} & \cdots & b_{nn} \end{bmatrix} =$$

-continued $$\begin{bmatrix} c_{11} & c_{12} & c_{13} & \cdots & c_{1n} \\ c_{21} & c_{22} & c_{23} & \cdots & c_{2n} \\ c_{31} & c_{32} & c_{33} & \cdots & c_{3n} \\ \cdot & \cdot & \cdot & & \cdot \\ \cdot & \cdot & \cdot & & \cdot \\ \cdot & \cdot & \cdot & & \cdot \\ c_{n1} & c_{n2} & c_{n3} & \cdots & c_{nn} \end{bmatrix}$$

where the entries of the C matrix are determined from the following rules:

$c_{11} = a_{11}b_{11} \oplus a_{12}b_{12} \oplus a_{13}b_{13} \oplus \cdots \oplus a_{1n}b_{1n}$ $c_{12} = a_{11}b_{21} \oplus a_{12}b_{22} \oplus a_{13}b_{23} \oplus \cdots \oplus a_{1n}b_{2n}$ $c_{13} = a_{11}b_{31} \oplus a_{12}b_{32} \oplus a_{13}b_{23} \oplus \cdots \oplus a_{1n}b_{3n}$ $c_{21} = a_{21}b_{11} \oplus a_{22}b_{12} \oplus a_{23}b_{13} \oplus \cdots \oplus a_{2n}b_{1n}$ $c_{32} = a_{31}b_{21} \oplus a_{32}b_{22} \oplus a_{33}b_{23} \oplus \cdots \oplus a_{3n}b_{2n}$ The $\oplus$ sign indicates a logical exclusive-OR operation. In other words, to obtain the entry $c_{rc}$ in the $r^{th}$ row and $c^{th}$ column of the result matrix C, logically AND each bit in the $r^{th}$ row of A by its corresponding bit in the $c^{th}$ column of $B^t$, and logically form the exclusive-OR of the resultant products. To accomplish these logical operations in the preferred embodiment of the present invention, the matrix $B^t$ is first loaded into the functional unit and the rows of the A matrix are then streamed through the functional unit at a rate of one row per clock period, generating successive elements of the result matrix C each clock period.

The vector bit-matrix functional unit in a preferred embodiment of the present invention can only store 32 rows of the B matrix at one time due strictly to physical limitations on the implementation within the existing Y-MP processor. Those skilled in the art will readily recognize that a vector bit-matrix multiply functional unit may be implemented which can store the entire 64 rows of the B matrix at one time using the teachings of the present invention.

Also, the transposition of the B matrix is not a strict requirement. Depending upon the implementation requirements, the present invention may be implemented as a matrix multiplication without the B matrix being transposed. Also, those skilled in the art will readily recognize that the $C = AB^t$ function supported by the present invention may be used to merely transpose the B vector producing $C = B^t$ if the A matrix contain all zeroes except for a diagonal of one's through the A matrix. In this fashion, the function $C = AB^t$ implemented with the present invention serves several purposes.

Since the vector bit-matrix functional unit can only store 32 rows of the B matrix, a longer instruction sequence is needed to perform the multiplication for matrices larger than $32 \times 32$. In this case, multiplication using the first 32 rows of B is performed as explained above. The functional unit is then cleared, and the remaining rows of B are loaded into it. The rows of A are again streamed through the unit, one per clock period, with the results stored in matrix D, beginning at column 33 (bit location 32 of the vector register). The C and D matrices are then merged to give the final result. By this method, 230 clock periods are required for performing the vector bit-matrix multiply instruction. If the functional unit were designed to processes the entire 64×64 matrix at once, only 128 clock periods would be required. The naming conventions for the data locations within the vector registers describe rows 1 through 64 of the matrices as being located in elements 0 through 63 of the vector registers. Columns 1 through 64 of the matrices are located in bits 63 through 0 of the vector registers.

A brief description of the Y-MP machine instructions used to perform the vector bit-matrix multiply operation is shown in Table 1. The instruction codes shown on the left of Table 1 indicate the opcode values in octal numbers. The opcode field (termed the g and h fields) is followed by the vector register designator fields i and j, which are sometimes indicated as don't care conditions with an x. The register designator fields i and j are followed by a opcode extension field k which allows the same opcode to perform slightly different functions. The Cray Assembly Language (CAL) mnemonics are included in the center column of Table 1 and the description of the result of each machine instruction is given on the right of Table 1.

TABLE 1

| Instruction | Vector Matrix Multiply Instructions | |
|---|---|---|
| | CAL | Description |
| 174xj4 | B LVj | Load row 1-32 of B into the vector bit-matrix multiply functional unit from vector register Vj. The rows of B are stored in the elements of vector register Vj. (VL ≦ 32) |
| 174xj5 | B UVj | Load rows 33-64 of B into the vector bit-matrix multiply functional unit from vector register Vj. The rows of B are stored in the element of vector register Vj. (VL ≧ 33) |
| 174ij6 | Vi LVjxBt | Logical bit matrix multiply of A and columns 1-32 of B$^t$ to C. The rows of A and C are stored in the elements of Vj and Vi, respectively. |
| 174ij7 | Vi UVjxBt | Logical bit matrix multiply of A and columns 33-64 of B$^t$ to D. The rows of A and D are stored in the elements of Vj and Vi, respectively. |
| 145ijk | Vi VjVk | Logical difference of (Vj) and (Vk) to Vi; merge C and D matrices stored in Vj and Vk to result matrix stored in Vi. |

Figure 3:
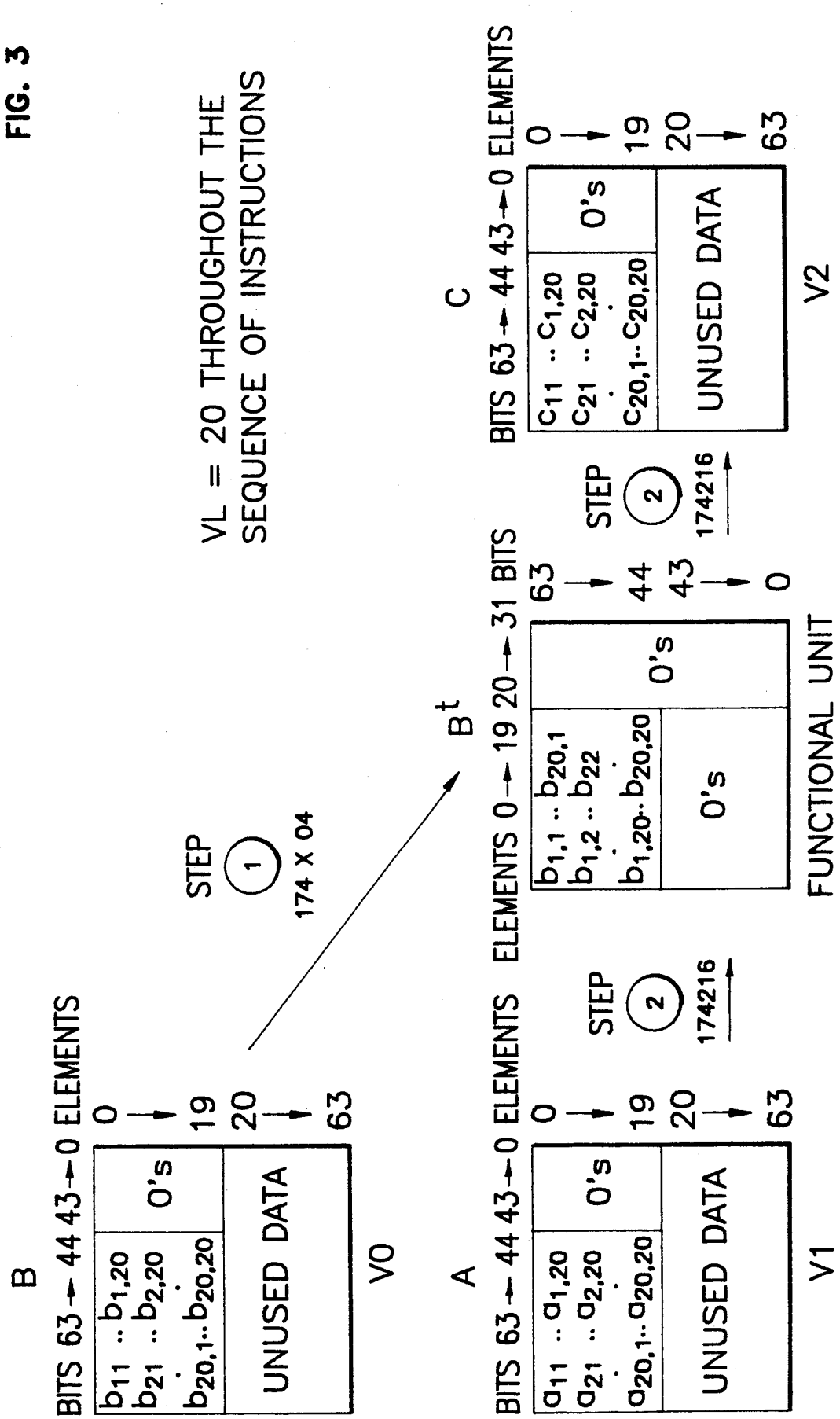
FIG. 3 is a detailed example of the instruction sequences used to multiply bit-matrices smaller than $32 \times 32$.

FIG. 3 shows an example of the instruction sequences used for matrices smaller than 32×32. FIG. 3 shows the steps involed in the multiplication of two 20×20 matrices. In this example, the bit matrices B and A are stored respectively in vector registers V0 and V1, elements 0-19, bit positions 44-63. Bit positions 0-43 of the first 20 elements must be zero-filled to obtian accurate results. Setting the vector length to 20 insures that elements 20-63 will not be used, making the data they contain irrelevant.

The sequence of instructions needed to perform the multiplication is listed below:
1. Instruction 174×04 loads matrix B into the functional unit from the source vector register V0. This instruction first zeros out the B storage area in the vector bit-matrix multiply functional unit, and then reads in the rows of B one per clock period, storing them as the columns of B$^t$.
2. Instruction 174216 streams the rows of matrix A from source vector register V1 through the vector bit-matrix multiply functional unit, one row per clock period. As each row of A passes through the unit, it is simultaneously multiplied by 20 columns of B$^t$ according to the previously mentioned rules, generating a single row of the result matrix C stored out to vector register V2.

Figure 4:
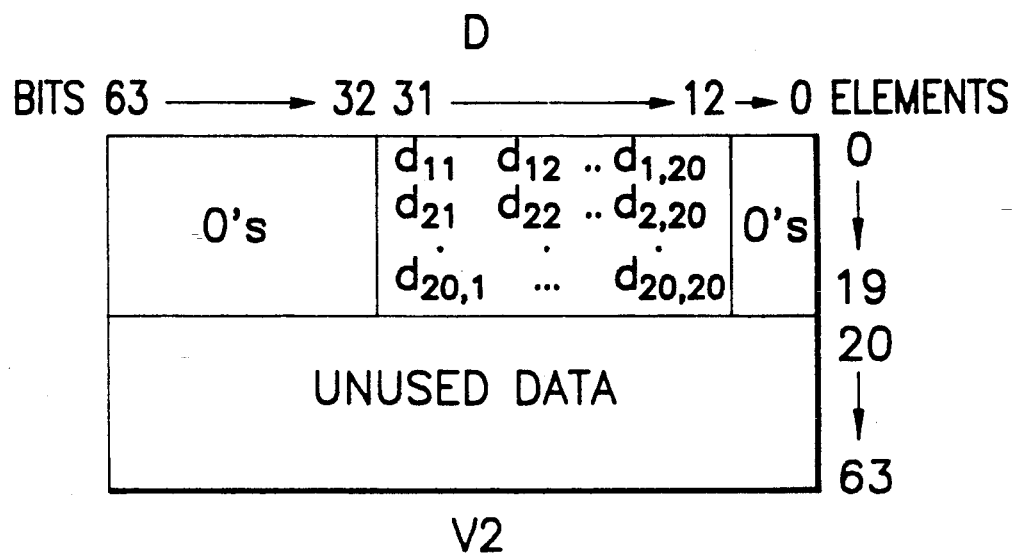
FIG. 4 is a result matrix formed using an alternative instruction sequence as that shown in FIG. 3.

While the sequence just described is the simplest and most efficient way to multiply 20×20 matrices, it is not unique. Instruction 174216, for example, could have been replaced by instruction 174217. While the latter instruction is normally used only for matrices larger than 32×32, it can still be used effectively here. In this case, the result matrix D would be located in bit positions 12-31, elements 0-19 of V2, as shown in FIG. 4.

Figure 5B:
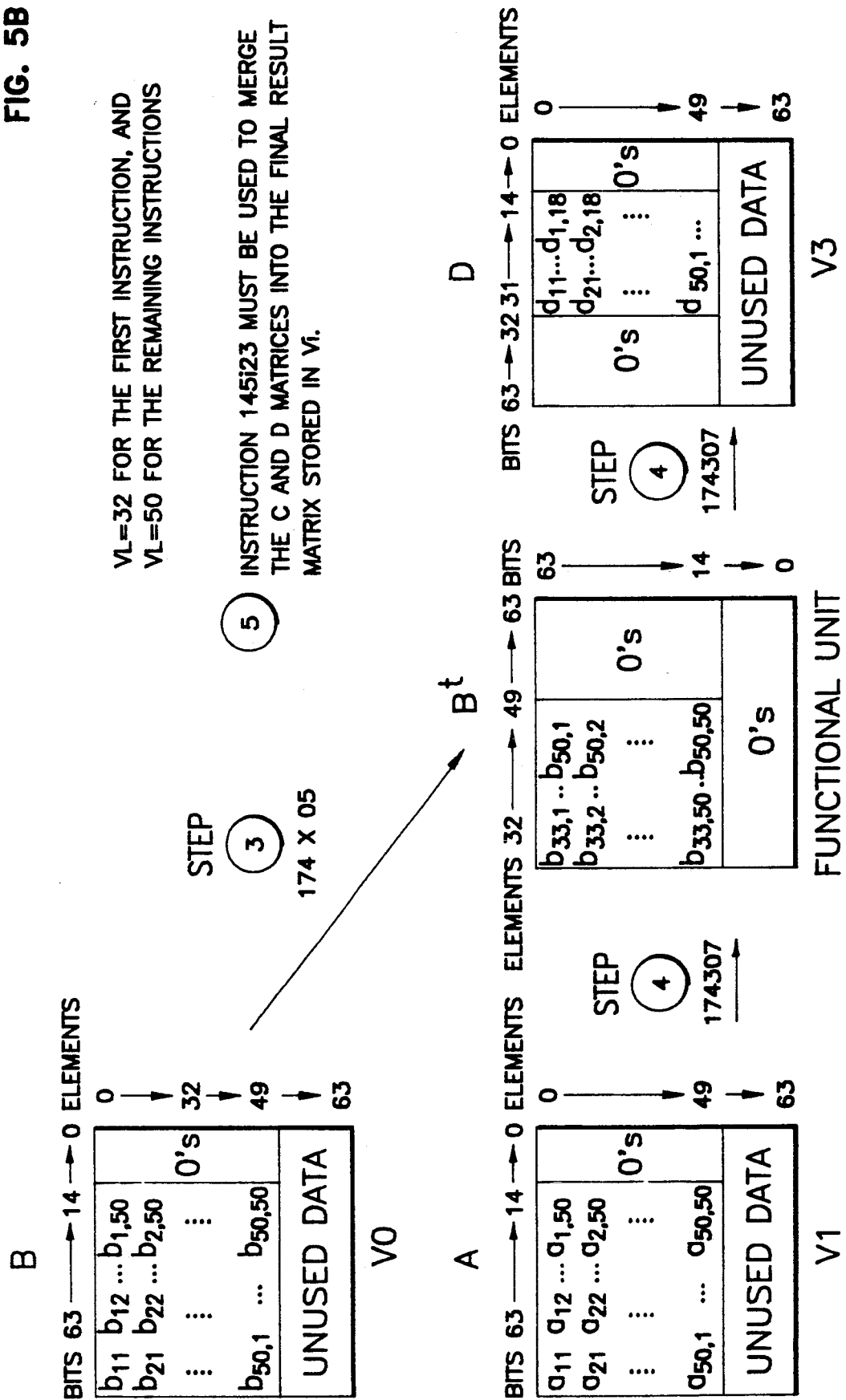

FIGS. 5A and 5B show an example of the instruction sequences for matrices larger than 32×32. FIGS. 5A and 5B show the steps involved in the multiplication of two 50×50 matrices. In this example, the bit matrices B and A are stored respectively in vector registers V0 and V1, elements 0-49, bit positions 14-63. Bit positions 0-13 of elements 0-49 must be zero-filled to obtain accurate results. The data in the remaining elements is not used and can be safely ignored. The vector length should be set to 32 before issuing the first instruction, since the vector bit-matrix multiply functional unit can store a maximum of 32 elements If the vector length (VL) is greater than 32, instruction 174×04 will discard the additional elements sent to the functional unit, but at a cost of one clock period per element.

The full sequence of instructions needed to perform the bit-matrix multiplication of FIGS. 5A and 5B is listed below:
1. Instruction 174×04 loads the first 32 elements of matrix B from vector register V0 into the vector bit-matrix functional unit. This instruction first zeros out the B storage area in the functional unit, and then reads in the rows of B, one per clock period, storing them as the columns of B$^t$. Before proceeding further, the vector length register VL should be reset to 50 to allow multiplication by the 50 bits of each element. It should stay at 50 for the duration of the instruction sequence.
2. Instruction 174216 streams the rows of matrix from vector register V1 through the bit-matrix multiply functional unit, one row per clock period. As each row of A passes through the unit, it is simultaneously multiplied by all 32 columns of B$^t$ according to the previously mentioned rules, generating a single row of the partial result matrix C stored in vector register V2. Matrix C at this point is a 50×32 matrix, since only 32 elements of matrix B were used to generate it.
3. Instruction 174×05 loads the remaining elements of matrix B from vector register V0 into the vector bit-matrix multiply functional unit, one per clock period, storing them as the columns of B$^t$ as mentioned above. A control signal sent to the functional unit identifies these elements as elements 32-49, rather than elements 0-17.
4. Instruction 174317 streams the rows of matrix A from vector register V1 through the functional unit again, this time generating the partial result matrix D stored in vector register V3. This matrix is a 50×18 matrix stored in the elements of V3 left justified in bit positions 0-31. The remaining bit positions of elements 0-49 will be zeroed out by the functional unit.

5. Instruction 145i23 merges the C and D matrices into a 50×50 result matrix, which is stored in vector register Vi (not shown) left justified in elements 0-49. The destination vector register can be one of those previously used so as to minimize usage of the vector registers.

It is not necessary that the vector bit-matrix multiply functional unit be incorporated into all processors of a multiprocessor supercomputer. In the preferred implementation, the logical circuitry required for its implementation replaces the circuitry for the floating point reciprocal functional unit in a standard Y-MP processor. On CPU's containing the vector bit-matrix multiply functional unit, the floating point reciprocal instructions 070ij0 and 174ij0, are made illegal. If one of them is used in program code, it will only advance through the issue circuitry as far as the current instruction parcel (CIP) register. There it will be held for 4 clock periods while the Error Exit and Waiting on Semaphore flags are set. These flags will cause an exchange, with the contents of the P register pointing to the illegal instruction. Software routines are then used to simulate the reciprocal instruction, and to advance the P register to point to the next instruction. An exchange back to the CPU will then cause the program code to resume execution.

VECTOR MATRIX MULTIPLY FUNCTIONAL UNIT CIRCUITS

Figure 6:
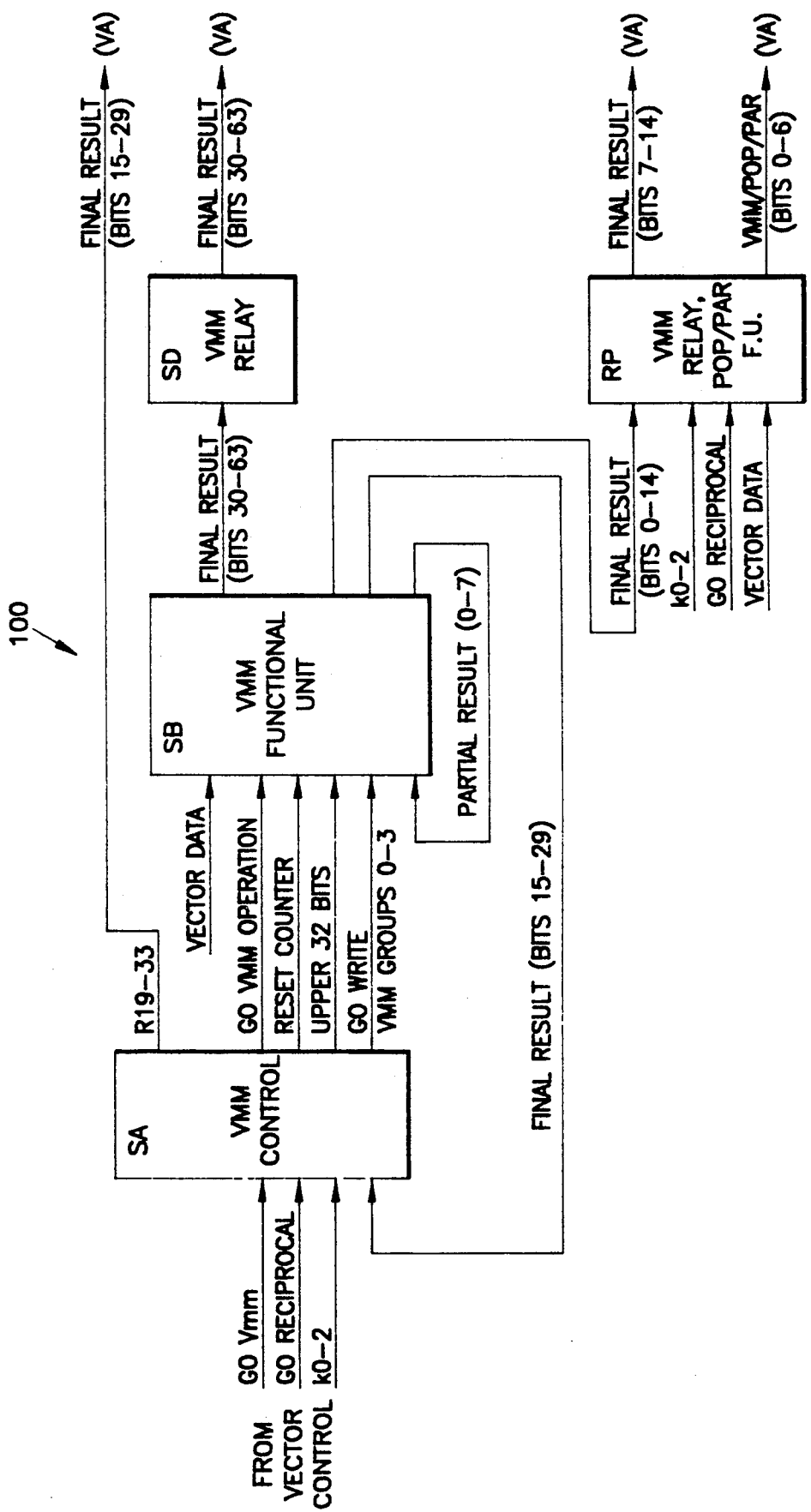
FIG. 6 is a detailed Vector Matrix Multiply (VMM) circuit block diagram showing individual control lines.

The Vector bit-Matrix Multiply (VMM) 100 block diagram is shown in FIG. 6. If there is no issue conflict within the processor, the VMM control circuit SA receives a control signal entitled "Go Vmm" from the vector control circuits of the processor. This signal is used to generate output signal "Go Vmm Operation" and the multi-bit signal "Go Write Vmm Groups 0-3" which are sent to the SB circuits. The "Go Vmm" signal activates the VMM SB circuits and the "Go Write Vmm Groups 0-3" begins the load operation of the B matrix. The control signal "Go Vmm" arrives at the earliest at clock period 5 from the vector control circuits since the first 4 clock periods are required to decode the opcodes (instruction) and to start up the vector operations. The control signal "Go Vmm" is received each clock period for the duration of the matrix operation unless there are vector register chaining conflicts.

The SA circuit shown in FIG. 6 also receives the signal "Go Reciprocal" from the instruction issue control circuitry of the processor control circuits. This signal is used to reset an element counter in the SA VMM control circuit and to generate the output signal "Reset Counter" which is sent to the SB circuits. The element counter of the SA circuit indicates which element of the B matrix is coming into the SB circuit at a given time. Since only eight elements can be fed from the B matrix to each group of the SB circuits, the SA circuit must tell the SB circuit which element is entering the SB circuit for the respective group.

The "Go Vmm" signal is also used to activate the "Go Vmm Operation" signal. The "Go Vmm Operation" signal is used to indicate to the SB circuits that the VMM operation is in progress and the vector data streaming through it is valid.

The signal "Go Reciprocal", which arrives at the SA control circuit at clock period 2, is also used to latch bit 2 of the k-field of the instruction to determine which upper or lower operation is going to be determined. Thus the SA circuit also receives all three bits of the k-field (labeled k0-2) of the instruction from the instruction issue control circuits of the processor. In response to this, the SA circuit generates the control signal "Upper 32 Bits", which is sent each clock period to the SB circuits to distinguish between the upper 32 bits of the matrix from the lower 32 bits.

The element counter internal to the SA circuit controls the timing of the multi-bit signal "Go Write Vmm Groups 0-3". During the first count from 0 to 7 of the SA element counter, the output signal "Go Write Vmm Group 0" (one signal line of the multi-bit "Go Write Vmm Groups 0-3") is transmitted each clock period to the Group 0 SB circuits. The element counter continues counting from 8 to 15, this time causing the transmission each clock period of the signal "Go Write Vmm Group 1" to the Group 1 SB circuits. In a similar manner, it causes the remaining signals "Go Write Vmm Group 2" and "Go Write Vmm Group 3" to be sent to the appropriate groups of SB circuits. If the signal "Go Vmm" signal is inactive, the element counter will hold and will not increment.

The SA circuit receives the multi-bit signal "Final Result bits 15-29" from the SB circuit. The SA circuit merely provides a path to synchronize this signal. The multi-bit signal "Final Result bits 15-29" holds part of the result of the bit-matrix multiply operation and enters the SA control circuit for the first time at clock period 9. The multi-bit signal "Final Result bits 15-29" is delayed for one clock period before being sent on to the output vector registers.

Figure 8:
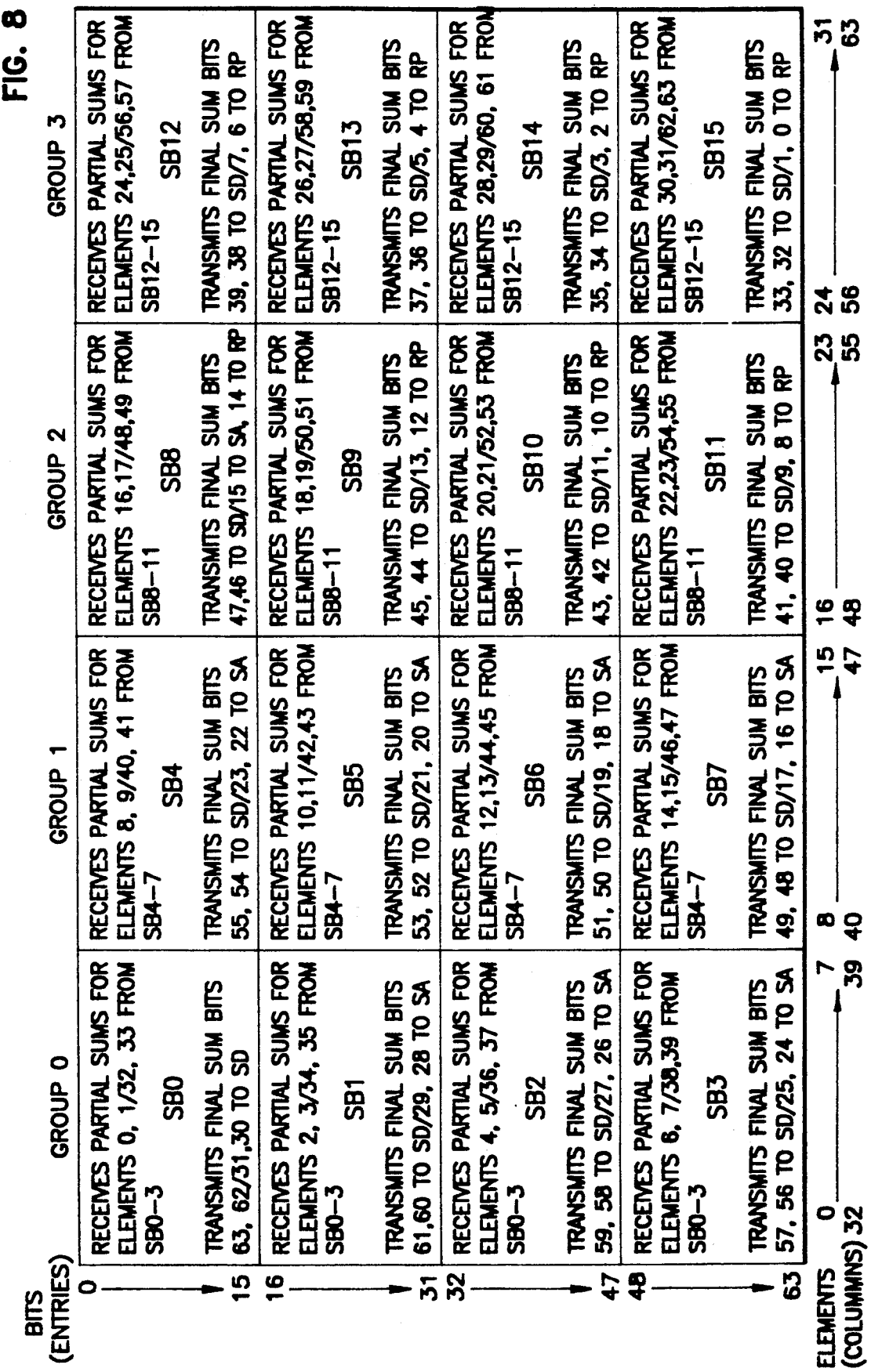
FIG. 8 shows the sixteen partitions which make up the Vector Matrix Multiply SB circuits.

The SB circuit of the VMM functional unit performs the matrix multiplication by performing logical AND and exclusive-OR operations on the matrix data. The SB circuit is partitioned into 16 subcircuits which are well ordered and identical. These 16 subcircuits are labeled SB0-SB15 and are shown in FIG. 8. (Refer to FIG. 8 for the specific Final Result bits sent from each SB subcircuit.) The 16 SB circuits store 32 rows of matrix B in controlled latches as 32 columns of B$^t$. The SB circuits are divided into four groups with each group handling 8 elements of B$^t$. Each group is further divided into 4 SB subcircuits with each SB subcircuit handling 16 bits. Individual circuits store 16 entries from each of the eight columns in the group. FIG. 8 shows the interconnection of the SB circuits showing the groups and the columns and entries stored in each circuit. These circuits also contain the circuitry that performs the logical multiplication of matrices A and B$^t$.

The SD circuit relays bits 30-63 of the final result from the SB circuits to the vector register steering circuits (VA). (Refer to FIG. 8 for the specific Final Result bits sent from each SB subcircuit.) The bits are delayed for one clock period in the SD circuit before being sent to the VA vector register steering circuits. Circuit SD is primarily a synchronization circuit.

In one implementation of the present invention, the Population/Parity Circuit RP is placed in the same vector functional unit and so the matrix multiply circuits share the fan out capabilities of the Population/Parity functional unit. The Population/Parity RP circuit relays bits 0-14 of the final result from the SB circuits to the VA vector register steering circuits to synchronize the data. (Refer to FIG. 8 for the specific Final Result bits sent from each SB subcircuit.) On the output of the Population/Parity RP circuit, bits 7-14 of the final result are latched for one clock period and then sent to the VA vector register circuits. Final result bits 0-6 are also steered through the same output path as that used by the vector pop/parity functional unit, and are sent to the VA vector register steering circuits.

VECTOR MATRIX MULTIPLY FUNCTIONAL UNIT OPERATION

Each vector register holds 64 elements (words) where an element consists of 64 bits. Under normal vector operation, one element (or one pair of elements) is streamed through a vector functional unit per clock period. The functional units are pipelined and the results are obtained every clock period. The amount of vector elements on which to operate is determined by the Vector Length register. For this example, assume a vector length of 64.

Before the VMM functional unit can multiply the bit matrices, the B matrix must be stored in the VMM functional unit before the A matrix can be streamed through it. The store matrix stores 64 elements of 64-bit words which correspond to 4096 bits. Due to the fact that the present invention is implemented in an existing Y-MP processor, the technology and packaging constraints require loading only 32 elements of the B matrix versus 64 elements of B matrix. The A matrix will still be streamed through with 64 elements.

The B matrix is mapped into the 4×4 arrangement of SB subcircuits. The SB subcircuits store a portion of the B matrix and also operate on the A matrix data fed to it to generate the VMM result. The partition of the B matrix is as follows:

(1) Each SB subcircuit will operate on 8 elements of the B matrix; hence to make up 32 elements, 4 columns of SB subcircuits are needed where each column represents 8 elements of 64 bits (see FIG. 8).

(2) Each SB subcircuit will operate on 16 bits of the A matrix and the B matrix, hence, to make up 64 bits, 4 rows of SB subcircuits are needed (see FIG. 8).

Figure 7:
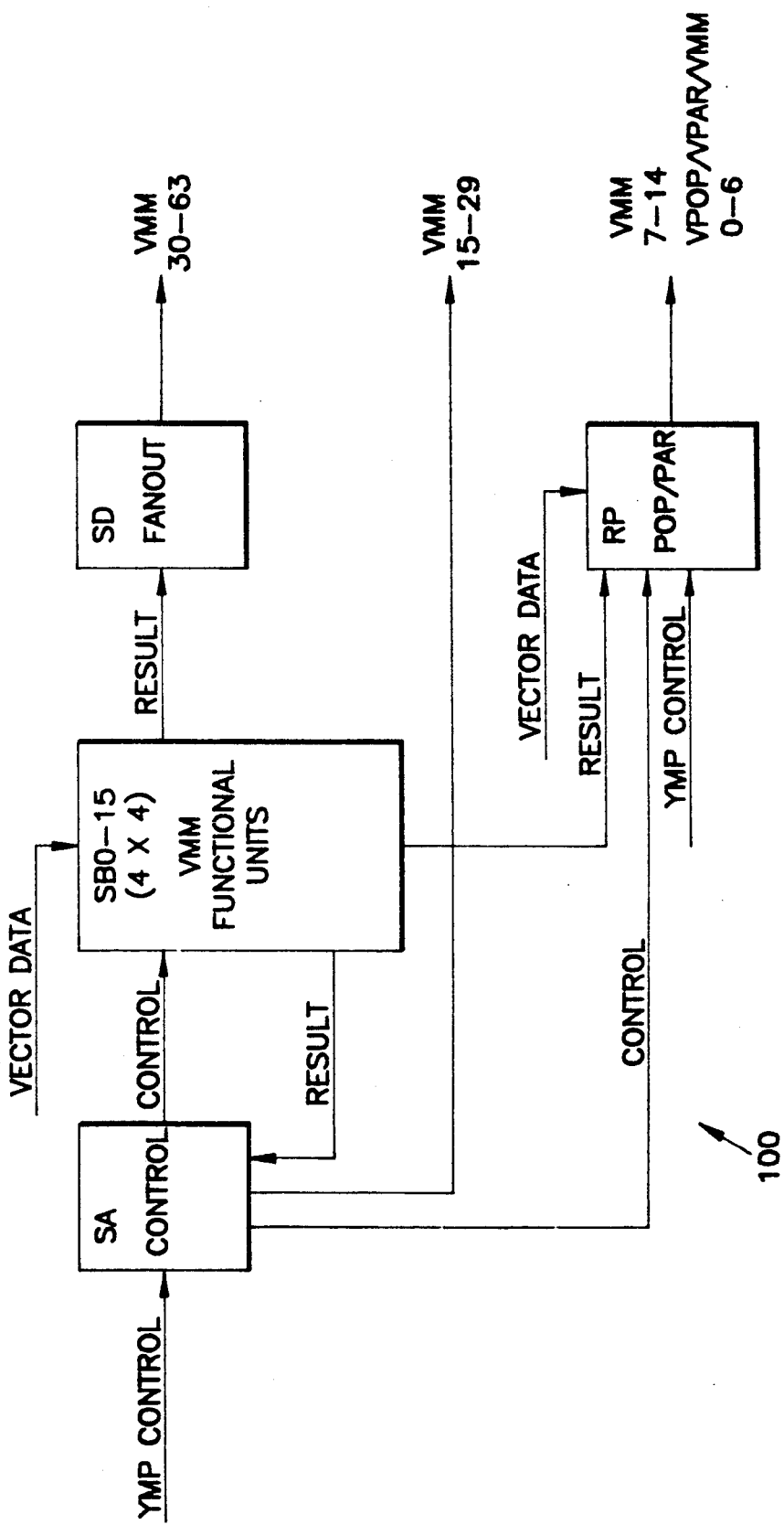
FIG. 7 is a simplified block diagram of the Vector Matrix Multiply (VMM) functional unit showing the control and data flow.

FIG. 7 is a simplified block diagram of te vector matrix multiply (VMM) functional unit showing the control and data flow. Referring to FIGS. 6 and 7, the loading of matrix B will be described. Instructions 174xj4 and 174xj5 are used to load matrix B into the functional unit. Instruction 174xj4 loads the first 32 rows of matrix B, and instruction 174xj5 loads the remaining rows of the matrix. The load operation is controlled by the signals "Reset Counter" and "Go Write Vmm Group 0-3". Four copies of these control signals are sent from the SA circuit to the SB circuits. Table 2 shows the SB circuits receiving each copy.

TABLE 2

| Control Signals for the SB Circuits | |
|---|---|
| Control Term | Destination SB Circuits |
| Go Vmm Operation | SB0, SB1, SB4, SB5 |
| Go Vmm Operation | SB8, SB9, SB12, SB13 |
| Go Vmm Operation | SB6, SB11, SB14, SB15 |
| Go Vmm Operation | SB2, SB3, SB7, SB10 |
| Go Write Vmm Group 0 | SB0, SB1, SB2, SB3 |
| Go Write Vmm Group 1 | SB4, SB5, SB6, SB7 |
| Go Write Vmm Group 2 | SB8, SB9, SB10, SB11 |
| Go Write Vmm Group 3 | SB12, SB13, SB14, SB15 |
| Upper 32 Bits | SB0, SB1, SB4, SB5 |
| Upper 32 Bits | SB8, SB9, SB12, SB13 |
| Upper 32 Bits | SB6, SB11, SB14, SB15 |
| Upper 32 Bits | SB2, SB3, SB7, SB10 |
| Reset Counter | SB0, SB1, SB4, SB5 |

TABLE 2-continued

| Control Signals for the SB Circuits | |
|---|---|
| Control Term | Destination SB Circuits |
| Reset Counter | SB8, SB9, SB12, SB13 |
| Reset Counter | SB6, SB11, SB14, SB15 |
| Reset Counter | SB2, SB3, SB7, SB10 |

Signal "Reset Counter" enters the SB circuits at clock period 5 and is used for two different functions. It zeros out the B storage area prior to loading new B data, and it resets the element counters on the SB circuits. While the counters on all 16 SB circuits are reset at the same time, only those in a particular group increment from 0 to 7 during any given clock period. The counters are similar to the one on the SA circuit and run in parallel with it, counting the rows of matrix B as they are stored.

Signal "Go Write Vmm Group 0-3" controls the incrementing of the counters and the gating of data into the B storage latches. In the event of a vector register chaining conflict, the lines of this signal are inactivate, causing the counters to hold. When the signal is again received, the counters resume operation, and incoming B data is gated into the storage latches.

Data from matrix B enters the functional unit at the earliest at clock period 5 from one of the vector registers. The data enters as 16-bit wide signal "Vector Data" on the sixteen different SB subcircuits used to store the particular row of the matrix. The rows of the matrix are loaded sequentially, one each clock period, beginning with row 1. Signal "Go Write Vmm Group 0-3" on each circuit is used to latch the data into the four circuits of a group simultaneously, with the first row latched at clock period 8. It is held there in controlled latches until it is cleared out by the signal "Reset Counter", prior to loading new B data.

Referring to FIGS. 6 and 7, the multiplying of matrix B' by matrix A will be described. Instructions 174ij6 and 174ij7 are used to multiply matrices A and B'. The first instruction multiplies A by the first 32 columns of B' to produce matrix C, and the second instruction multiplies A by the remaining columns of B' to produce matrix D. The signal "Go Vmm Operation" and "Upper 32 Bits" control the multiplication operation. Four copies of these control signals are sent from the SA circuit to the SB subcircuits. Table 2 shows the SB circuits receiving each copy.

Issuing either instruction causes the rows of matrix A to stream through the functional unit at the rate of one per clock period (assuming no operand or chaining conflict), entering as 16-bit wide signal "Vector Data". Row 1 enters the unit at clock period 5 and is multiplied simultaneously by all 32 columns of B'. Since each circuit stores only 16 entries from each eight columns, it can only generate partial results for those eight columns. These partial results (signal "Partial Result (0-7)") are sent 2 clock periods later to specific circuits within the group to generate the final result. Within Group 0 of FIG. 8, for example, subcircuit SB0 receives the partial results for columns 0 and 1, circuit SB1 receives the partial results for columns 2 and 3, and so on.

For the final result to be computed, signal "Go Vmm Operation" must be active. Up to 32 bits of the final result are then computed each clock period. This corresponds to one row of either matrix C or matrix D per clock period. In the event of a vector chaining conflict, signal "Go Vmm Operation" is inactive, and the final result is ignored.

Signal "Upper 32 Bits" is used to steer two bits of the final result within the SB circuit either to matrix C or to matrix D. For a 174ij6 instruction, signal "Upper 32 Bits" is active, and the two bits are steered to matrix C. For a 174i77 instruction, signal "Upper 32 Bits" is inactive, and the two bits are steered to matrix D.

All final result bits are relayed through one of three circuits before being sent to the destination vector register. The path of these bits through the SA and SD circuits is a direct one: the incoming bits are merely latched for one clock period before being sent to the VA vector register steering circuits. On the RP circuit, however, only bits 7-14 are sent directly through the circuit. Bits 0-6 are multiplexed through the same output path as that used by the vector pop/parity functional unit.

The SB circuit connections shown in FIG. 8 describe the data flow through the VMM functional unit. The 16 SB subcircuits are comprised of combinatorial logic which performs logical AND products on the data and logical exclusive-OR of the logical AND products. The combinatorial logic of the 16 SB subcircuits implement the following rules:

$$c_{11} = a_{11}b_{11} \oplus a_{12}b_{12} \oplus a_{13}b_{13} \oplus \ldots \oplus a_{1n}b_{1n}$$

$$c_{12} = a_{11}b_{21} \oplus a_{12}b_{22} \oplus a_{13}b_{23} \oplus \ldots \oplus a_{1n}b_{2n}$$

$$c_{13} = a_{11}b_{31} \oplus a_{12}b_{32} \oplus a_{13}b_{23} \oplus \ldots \oplus a_{1n}b_{3n}$$

$$\vdots$$

$$c_{21} = a_{21}b_{11} \oplus a_{22}b_{12} \oplus a_{23}b_{13} \oplus \ldots \oplus a_{2n}b_{1n}$$

$$\vdots$$

$$c_{32} = a_{31}b_{21} \oplus a_{32}b_{22} \oplus a_{33}b_{23} \oplus \ldots \oplus a_{3n}b_{2n}$$

$$\vdots$$

The 64 $a_{nn}b_{nn}$ terms of each of the above equations are divided into four parts and processed in one parallel operation. The four parts of the 64 $a_{nn}b_{nn}$ terms of each of the above equations are logically ANDed and the 16 products of each part are exclusive-ORed to produce 4 partial results. These 4 partial results are then exclusive-ORed to produce the final result of each matrix location within the C matrix.

Figure 9:
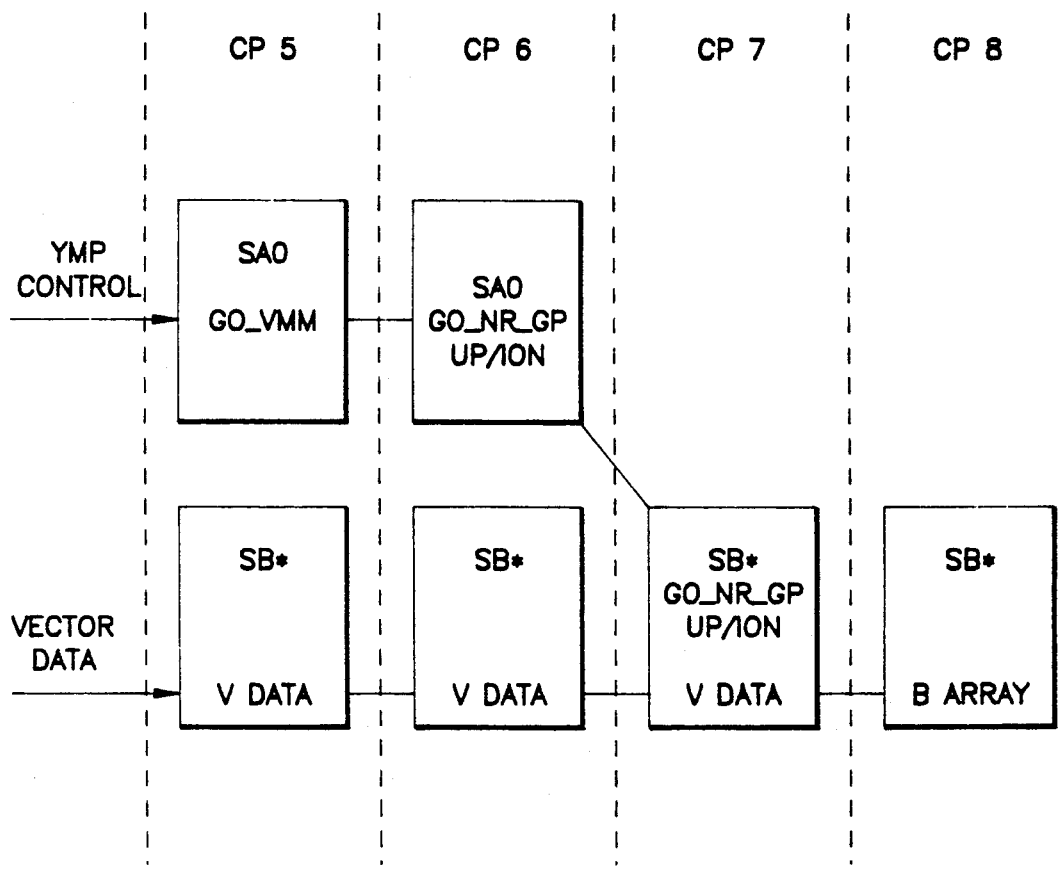
FIG. 9 is a timing diagram showing the sequential operation of the Vector Matrix Multiply circuits for the loading of the B matrix.

FIG. 9 is a timing diagram showing the sequential operation of the Vector Matrix Multiply circuits for the loading of the B matrix in response to the machine level instructions 174xj4 and 174xj5. The clock periods (CP) are shown at the top of FIG. 9 with time increasing to the right. The diagram begins at clock period 5 since it takes 4 clock periods for instruction decode before the instruction issue circuitry and vector control circuitry issues commands to the VMM functional unit.

In clock period 5, the control circuit SA receives the control command signal "Go Vmm" from the vector control circuits of the processor, as described above in conjunction with FIG. 6. At the same time, the SB circuits begin receiving the B matrix data for loading.

In clock period 6, the SA circuit generates the "Go Write Vmm Groups 0-3" control signals control the loading of the data. Concurrent with this, the vector data remains ready for loading since the control signals are not yet available in clock period 6.

In clock period 7, the SB circuits load the B matrix vector data based upon the conditions of the "Go Write Vmm Group 0-3" to determine which data is loaded into which of the 16 SB subcircuits. In clock period 8, the load operation is completed.

Figure 10:
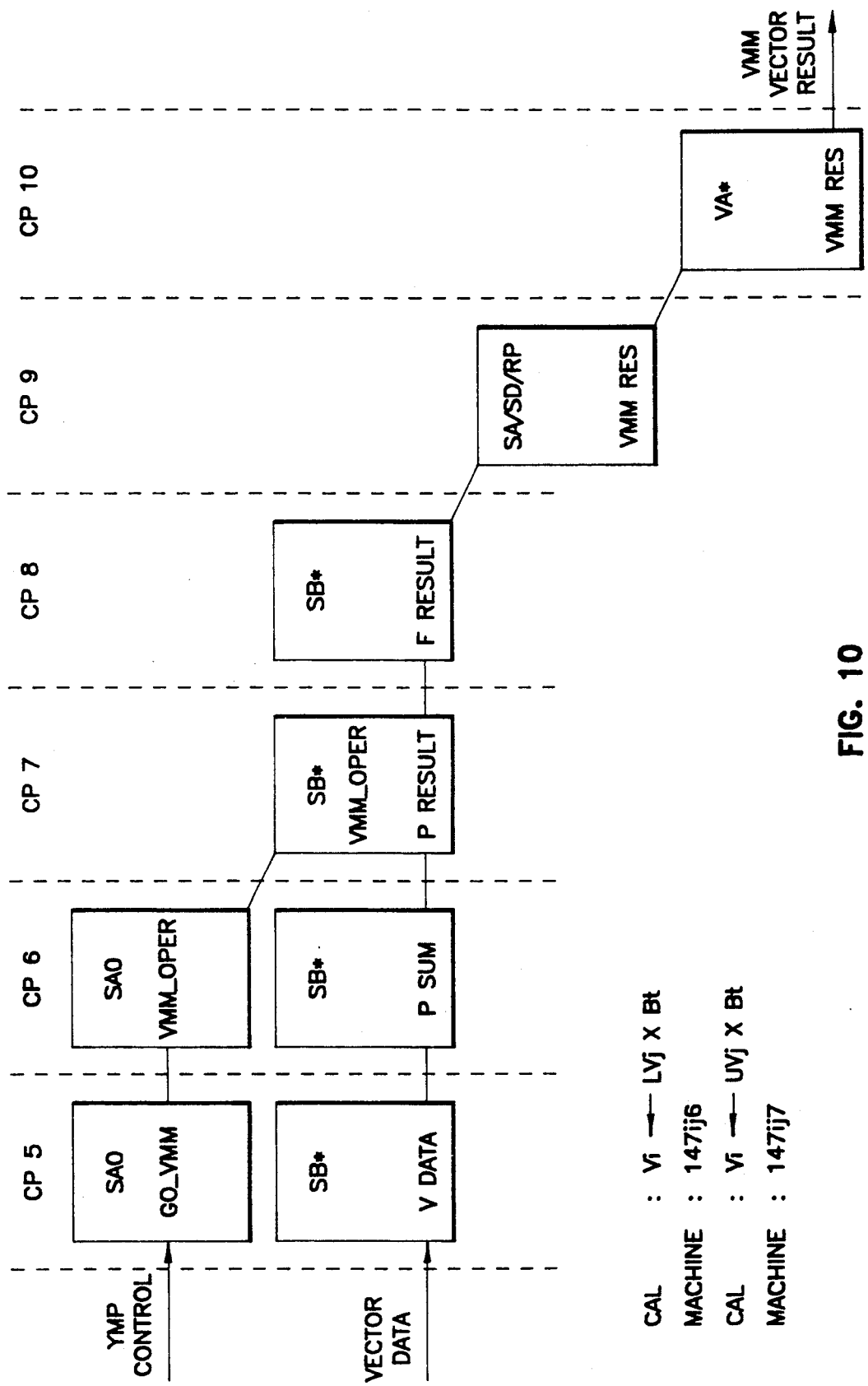
FIG. 10 is a timing diagram showing the sequential operation of the Vector Matrix Multiply circuits for the multiplication of the A matrix by the $B^t$ matrix.

FIG. 10 is a timing diagram showing the sequential operation of the Vector Matrix Multiply circuits for the multiplying of the A matrix by the B' matrix in response to the machine level instructions 174xj6 and 174xj7. The clock periods (CP) are shown at the top of FIG. 10 with time increasing to the right. The diagram begins at clock period 5 since it takes 4 clock periods for instruction decode before the instruction issue circuitry and the vector control issue commands to the VMM functional unit.

In clock period 5, the control circuit SA receives the control command signal "Go Vmm" from the vector control circuits of the processor, as described above in conjunction with FIG. 6. At the same time, the SB circuits begin receiving the A matrix data for multiplying.

In clock period 6, the SA circuit generates the "Go Vmm Operation" control signal. In the data path, the A matrix data begins streaming through the SB subcircuits to perform the ANDing operation for the 16 $a_{nn}b_{nn}$ terms of each of the four parts of the 64 term equations followed by the exclusive-ORing operation of the 16 products of each of the 4 parts to generate the 4 single-bit serial partial results.

In clock period 7, the SB circuits receive the control signal "Go Vmm Operation" and the SB subcircuits fanout the 4 partial result to the appropriate SB subcircuits.

In clock period 8, the SB subcircuits perform the final exclusive-OR operation on the 4 partial results to produce the single final result of each equation.

In clock period 9, the synchronization circuits SA, SD and RP capture the final results.

In clock period 10, the final results of the vector matrix multiply operation are steered in the resultant vector register. All of the above operations are pipelined such the entire vector operation takes 230 clock periods.

While the present invention has been described in connection with the preferred embodiment thereof, it will be understood that many modifications will be readily apparent to those of ordinary skill in the art, and this application is intended to cover any adaptations or variations thereof. For example, although the preferred implementation required that the multiplication of the B matrix be performed in two 32-bit steps due to space limitations of the Y-MP processor, those skilled in the art will readily recognize that the entire vector matrix multiplication could be performed as one 128 clock period step if implemented as a separate functional unit within a vector processor.

It is manifestly intended that this invention be limited only by the claims and equivalents thereof.

We claim:

1. A vector bit matrix multiplication system in a vector computer, comprising:
   synchronization means including a clock signal for synchronizing concurrent operations in the system;
   a first vector register for storing a first set of data representative of at least a portion of a first bit matrix;
   means for providing a second set of data representative of at least a portion of a second bit matrix;
   control means connected to the first vector register for loading the first bi matrix into a vector bit matrix multiplication means under control of the clock signal;

said control means further connected for serially streaming the second set of data representative of a second bit mtraix on a row by row basis through the vector bit matrix multiplication means under control of the clock signal, such that data representing one row of the second bit matrix is streaming through at a time;

said multiplication means connected to the control means and the first vector register for concurrently multiplying data representing each row of the second bit matrix by all data loaded from the first vector register and serially producing an intermedaite result which comprises data representing a row of a third set of data representative of the third bit matrix in a pipelined operation; and a result vector regsiter connected to the multiplication means for serially storing the third set of data representative of the third bit matrix on a row by row basis.

2. The system according to claim 1 wherein said control means is further connected for transposing the first bit matrix.

3. The system according to claim 1 wherein the multiplication means further includes logical AND circuits and logical exclusive-OR circuits for forming a bit of data represented by a matrix entry $C_{rc}$ in the $r^{th}$ row and $c^{th}$ column of the third bit matrix by sending each bit of data in the $r^{th}$ row of the second bit matrix and the corresponding bit of data in the $c^{th}$ column of the first bit matrix through the logical ANd circuits to produce a resultant product bits of data and sending the resultant product bits of data through the logical exclusive-OR circuits.

4. A vector bit matrix multiplication functional system in a vector computer, comprising:

synchronization means including a clock signal for synchronizing concurrent operations in the system;

means for providing a first set of data representative of at least a portion of a first bit matrix;

means for providing a second set of data representative of at least a portion of a second bit matrix;

multiplication means connected for receiving the first set of data representative of at least a portion of a first bit matrix, connected for receiving the second set of data representative of at least a portion of a second bit matrix and for concurrently multiplying data representing each row of the second bit matrix by all data of the first bit matrix and serially producing an intermediate result which comprises data representing a row of a third set of data representative of the third bit matrix in a pipelined operation; and control means connected to the multiplication means for loading the first set of data representative of at least a portion of a first bit matrix into the multiplication means and for subsequently serially streaming the second set of data representative of at least a portion of a second bit matrix on a row by row basis through the multiplication means under control of the clock signal, such that data representing one row of the second bit matrix is streaming through at a time;

means connected to the mulitplication means for serially storing the third set of data representative of the third bit matrix on a row by row basis.

* * * * *

UNITED STATES PATENT AND TRADEMARK OFFICE
CERTIFICATE OF CORRECTION

PATENT NO. : 5,170,370

DATED : December 8, 1992

INVENTOR(S) : William Lee et al.

It is certified that error appears in the above-identified patent and that said Letters Patent is hereby corrected as shown below:

page 1 of 3

In column 3, line 1, "user,s" should read --user's-- therefore.

In column 3, line 4, insert --CM-2-- after word "specialized" therefore.

In column 3, line 59, "diagram" should read --diagrams-- therefore.

In column 4, line 1, "example" should read --examples-- therefore.

In column 4, line 36, "word" should read --words-- therefore.

In column 5, line 12, "1≦n≦64)." should read -- 1≤n≤64).-- therefore.

In column 6, line 56, "contain" should read --contains-- therefore.

In column 7, line 6, "processes" should read --process-- therefore.

In column 7 (table 1), line 32, "row" should read --rows-- therefore.

In column 7, line 36, "(VL≦32)" should read --(VL≤32)-- therefore.

UNITED STATES PATENT AND TRADEMARK OFFICE
CERTIFICATE OF CORRECTION

PATENT NO. : 5,170,370  
DATED : December 8, 1992  
INVENTOR(S) : William Lee et al.

Page 2 Of 3

It is certified that error appears in the above-identified patent and that said Letters Patent is hereby corrected as shown below:

In column 7, line 41, "(VL≤33)" should read --(VL≥33) --. therefore.

In column 7, line 53, insert --TABLE 1-Vector Matrix Multiply Instructions-- after the letters "Vi" therefore.

In column 8, line 37, "is" should read --are-- therefore.

In column 8, line 49, insert --A-- after word "matrix" therefore.

In column 11, line 22, insert --operation of the B-- after the word "store" therefore.

In column 11, line 42, "te" should read --the-- therefore.

In column 13, line 7, "174 i 77" should read --174ij7-- therefore.

In columns 13 and 14, lines 44 and 29 respectively, "result" should read "results" therefore.

In column 14, line 68 (claim 1), "bi" should read --bit-- therefore.

In column 15, line 15 and 16, "intermedaite" should read --intermediate-- therefore.

UNITED STATES PATENT AND TRADEMARK OFFICE
CERTIFICATE OF CORRECTION

PATENT NO. : 5,170,370
DATED : December 8, 1992
INVENTOR(S) : William Lee et al.

It is certified that error appears in the above-identified patent and that said Letters Patent is hereby corrected as shown below:

In column 15, line 19, "regsiter" should read --register-- therefore.

In column 15, line 34 (claim 3), "AND" should read --AND-- therefore.

In column 16, line 32 (claim 4), "mulitplication" should read --multiplication-- therefore.

Signed and Sealed this

Twenty-eighth Day of December, 1993

Attest:

BRUCE LEHMAN

*Attesting Officer*     *Commissioner of Patents and Trademarks*